United States Patent [19]
Goto

[11] Patent Number: 6,075,911
[45] Date of Patent: Jun. 13, 2000

[54] OPTICAL COUPLING SYSTEM USING GEL RESIN AND THE MOUNTING STRUCTURE

[75] Inventor: Akio Goto, Tokyo, Japan

[73] Assignee: NEC Corporation, Tokyo, Japan

[21] Appl. No.: 09/023,213

[22] Filed: Feb. 13, 1998

[30] Foreign Application Priority Data

Feb. 13, 1997 [JP] Japan .................................. 9-044717

[51] Int. Cl.[7] .................................................. G02B 6/26
[52] U.S. Cl. ............................... 385/31; 385/49; 385/88; 385/94
[58] Field of Search ................................ 385/31, 88–94, 385/49

[56] References Cited

U.S. PATENT DOCUMENTS

| | | | |
|---|---|---|---|
| 4,186,996 | 2/1980 | Bowen et al. | 385/94 |
| 4,359,773 | 11/1982 | Swartz et al. | 372/26 |
| 4,762,381 | 8/1988 | Uemiya et al. | 385/88 |
| 5,121,457 | 6/1992 | Foley et al. | 385/89 |
| 5,226,052 | 7/1993 | Tanaka et al. | 372/36 |
| 5,392,372 | 2/1995 | Kurata et al. | 385/88 |
| 5,416,871 | 5/1995 | Takahashi et al. | 385/88 |
| 5,454,055 | 9/1995 | Kragl et al. | 385/14 |
| 5,546,489 | 8/1996 | Sasaki et al. | 385/88 |
| 5,583,637 | 12/1996 | Tokano et al. | 356/345 |
| 5,793,914 | 8/1998 | Sasaki | 385/49 |

FOREIGN PATENT DOCUMENTS

| | | |
|---|---|---|
| 0 559 365 | 9/1993 | European Pat. Off. . |
| 0 589 711 | 3/1994 | European Pat. Off. . |
| 54-130041 | 10/1979 | Japan . |
| 61-090108 | 5/1986 | Japan . |
| 61-90108 | 5/1986 | Japan . |
| 63-14489 | 1/1988 | Japan . |
| 63-90108 | 4/1988 | Japan . |
| 63-100790 | 5/1988 | Japan . |
| 64-44905 | 2/1989 | Japan . |
| 7-174944 | 7/1995 | Japan . |
| 8-248274 | 9/1996 | Japan . |
| WO 96/00918 | 1/1996 | WIPO . |

*Primary Examiner*—John D. Lee
*Assistant Examiner*—Juliana K. Kang
*Attorney, Agent, or Firm*—Young & Thompson

[57] ABSTRACT

An optical coupling system has a semiconductor laser ("LD") element and an optical fiber to be optically coupled with the LD element, the optical coupling system being filled with optically transparent gel resin with a refractive index higher than that of the air and lower than that of the optical fiber, the surface of the gel resin may be covered with a moisture-blocking resin.

7 Claims, 5 Drawing Sheets

OPTICAL COUPLING SYSTEM USING GEL RESIN AND THE MOUNTING STRUCTURE

FIELD OF THE INVENTION

This invention relates to an optical coupling system of optical modules used in optical communication apparatus and an airtight-seal mounting structure for such an optical coupling system.

BACKGROUND OF THE INVENTION

For example, conventional optical coupling systems between LD (semiconductor laser) and an optical fiber to be used in an optical module are shown in FIGS. 1A and 1B. The first system is so composed that a LD element 1 and an optical fiber 2 are, as shown in FIG. 1A, directly optically coupled. The second system is so composed that a lens 3 is, as shown in FIG. 1B, inserted between the LD element 1 and the optical fiber 2, whereby light beams to be emitted from the LD element 1 are converged and coupled to the optical fiber 2.

Furthermore, there is another system that liquid 4 with a proper refractive index as a refractive-index controlling material is, as shown in FIG. 1C. injected to relax the coupling tolerance. In this system, the process of injecting liquid 4 into the optical module and the airtight sealing process are complicated. Therefore, the productivity must be lowered.

Meanwhile, the conventional airtight sealing structure of the optical module is given by mounting an optical coupling system in a package (PKG) made of metal or ceramic, thereafter airtightly sealing a metal or ceramic cap by using seam welding, glass seal, solder seal etc.

However, the conventional coupling systems between the LD element and the optical fiber have several problems. First, the direct coupling system shown in FIG. 1A, which can be cheaply fabricated as having the simple structure, has a low coupling efficiency between the LD element 1 and the optical fiber 2 since the spot sizes of the LD element 1 and the optical fiber 2 are different from each other, so that the optical power of the optical module cannot be increased.

Second, the optical coupling system using the lens 3 as shown in FIG. 1B, in which the coupling efficiency can be enhanced since the beams emitted from the LD element 1 are converged, needs to fix the three components, i.e., LD element 1, lens 3 and optical fiber 2 when fabricating the optical module, thereby complicating the fabrication. Further, the optical axis needs to be regulated precisely. Thus, the productivity of the optical module must be lowered.

Third, in the method of injecting liquid 4 with a proper refractive index as a refractive-index controlling material as shown in FIG. 1C, the process of injecting liquid 4 into the optical module and the airtight sealing process are complicated. Therefore, the productivity must be lowered.

Furthermore, in the conventional airtight sealing techniques, there are problems that the shape of the optical module is limited depending on the respective sealing techniques and a member to be used inside the module needs to be heat-proof as it is heated at a high temperature in the airtight sealing process.

SUMMARY OF THE INVENTION

Accordingly, it is an object of the invention to provide an optical coupling system which has a high efficiency and can be easily fabricated without any regulation.

It is a further object of the invention to provide a mounting structure for an optical coupling system where the productivity of optical module can be improved and the manufacturing cost can be reduced.

According to the invention, an optical coupling system comprises a LD element and an optical fiber to be optically coupled with the LD element, wherein the optical coupling system is filled with optically transparent gel resin with a refractive index higher than that of the air and lower than that of the optical fiber.

According to another aspect of the invention, a mounting structure, comprises: an optical coupling system comprising a LD element and an optical fiber to be optically coupled with the LD element; and a substrate including an electric circuit;

wherein the optical coupling system is mounted on the substrate, the optical coupling system is filled with optically transparent gel resin with a refractive index higher than that of the air and lower than that of the optical fiber, the optical coupling system is surrounded by the gel resin and the surface of the gel resin is covered with moisture-blocking resin, and the optical coupling system and a predetermined IC of the electric circuit are covered with the moisture-blocking resin.

Further according to another aspect of the invention, a mounting structure, comprises: an optical coupling system comprising a LD element and an optical fiber to be optically coupled with the LD element; and a substrate on which the LD element and the optical fiber are mounted;

wherein the optical coupling system is filled with first resin which is optically transparent and is solidified into gel state.

Further according to another aspect of the invention, a mounting structure, comprises: an optical coupling system comprising a LD element and an optical fiber to be optically coupled with the LD element; a substrate on which the LD element and the optical fiber are mounted; and an interface substrate which includes an electric circuit for driving and controlling the LD element, the substrate being mounted on the interface substrate;

wherein the optical coupling system is filled with first resin which is optically transparent and is solidified into gel state, and the surface of the first resin and a predetermined electronic part, wiring or integrated circuit on the interface substrate are covered with second resin to block moisture.

Some effects obtained by the invention are as follows:

1) By using gel resin with a refractive index that is higher than that of the air and lower than that of the optical fiber for the optical coupling system composed of the LD element and the optical fiber, the coupling tolerances in both the coupling direction and the direction perpendicular to the optical axis can be relaxed. Therefore, the high-efficiency optical coupling system can be easily fabricated without any regulation.

2) By using gel resin, the filling process into the optical system is facilitated. The workability is enhanced compared with the case of filling liquid.

3) Further, gel resin can be filled without applying stress to the optical fiber, IC wiring of electric circuit etc.

4) Also, by using gel resin and moisture-blocking resin to cover gel resin, the airtight sealing process required with the conventional optical modules can be omitted. Therefore, the manufacturing cost of optical module can be reduced.

5) Furthermore, in the invention, the interface substrate can be fabricated by mounting the optical coupling system on the substrate and then potting it together with LST using resin. Namely, the conventional processes that the optical coupling system is mounted in a package, airtight-sealed and then mounted on the interface substrate are not necessary. Thus, the interface substrate can be cheap and easily fabricated.

BRIEF DESCRIPTION OF THE DRAWINGS

The invention will be explained in more detail in conjunction with the appended drawings, wherein.

DESCRIPTION OF THE PREFERRED EMBODIMENTS

Figure 1A:
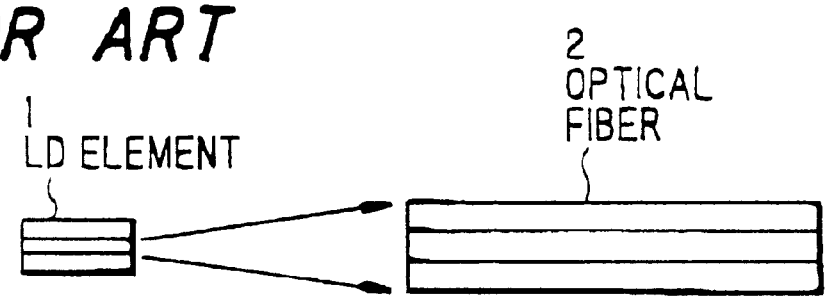
FIGS. 1A to 1C are illustrations showing examples of optical coupling systems between a LD element and an optical fiber.
Figure 1B:
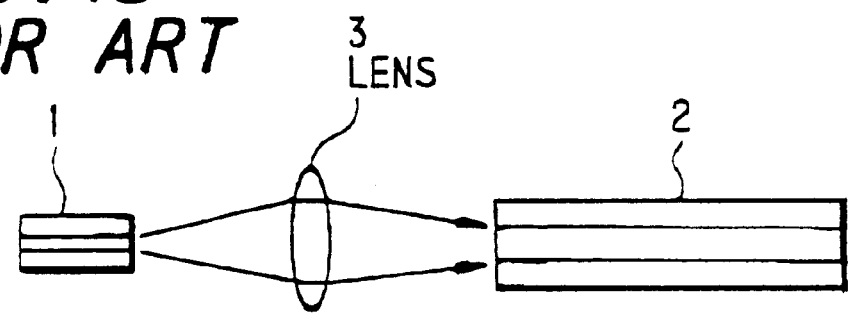
Figure 1C:
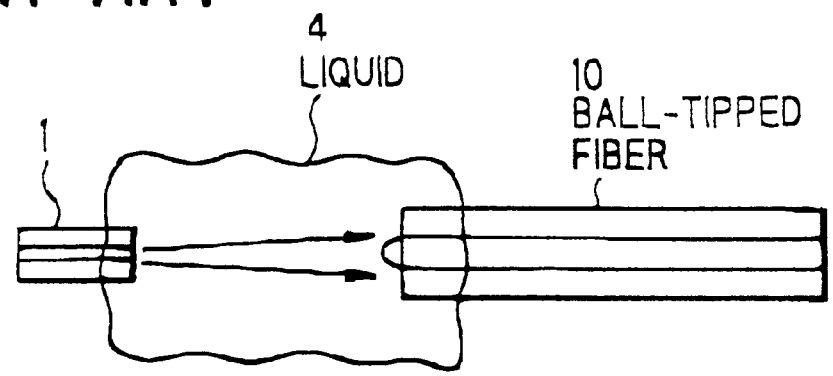
Figure 2A:
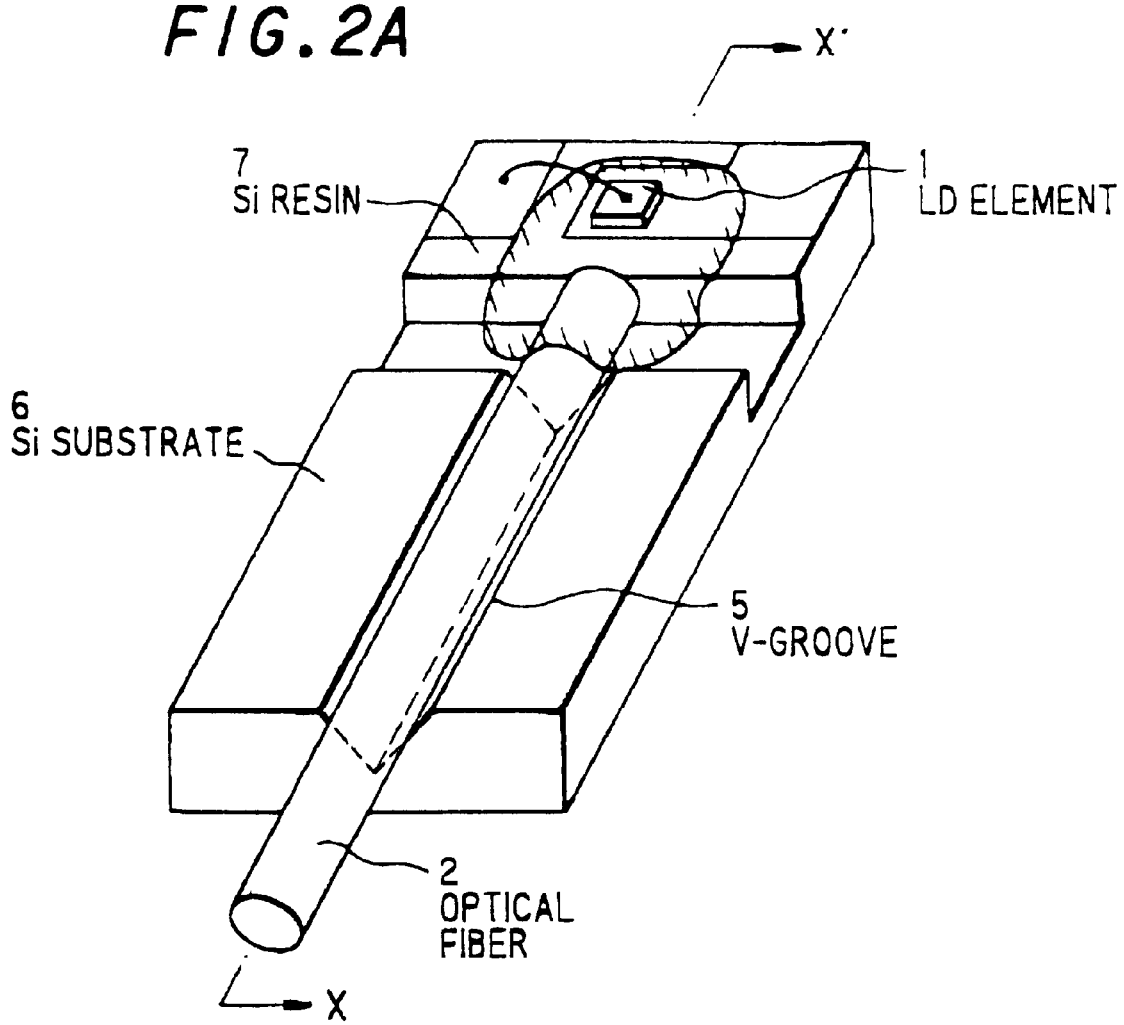
FIG. 2A is a perspective view showing an optical coupling system in a preferred embodiment according to the invention.

A LD element—optical fiber coupling system filled with resin in the preferred embodiment according to the invention will be explained in FIGS. 2A and 2B. FIG. 2A is a perspective view showing the optical coupling system and FIG. 2B is a partial cross sectional view cut along the line X–X' in FIG. 2A.

Figure 2B:
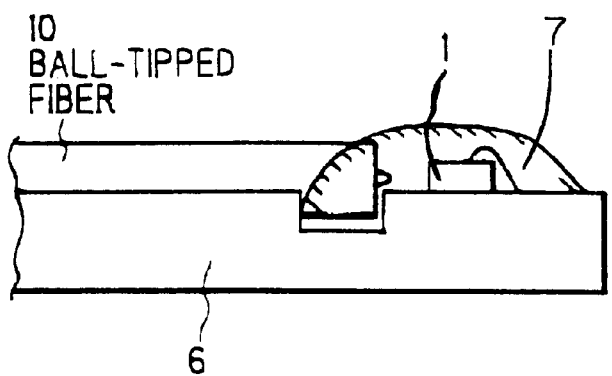
FIG. 2B is a partial cross sectional view cut along the line X–X' in FIG. 2A.

Referring to FIGS. 2A and 2B, the optical coupling system in the embodiment is fabricated by mounting an optical fiber 2, which is disposed on a V-groove 5 of a silicon substrate 6, and a LD element 1 on the silicon substrate 6 without any regulation, thereafter filling the clearance between the LD element 1 and the optical fiber 2 with liquid silicone resin 7. When it is filled with a material with a refractive index between that of the air (n=1) and that of the optical fiber (n=1.45), the apparent spot size of light beams emitted from the LD element 1 can be enlarged, thereby enhancing the coupling efficiency to the optical fiber 2.

Further, when a ball-tipped fiber 10 with a lens formed on the tip of the core is used as shown in FIG. 2B, the coupling tolerance can be relaxed, thereby providing easily an optical coupling system with a high efficiency.

Figure 3A:
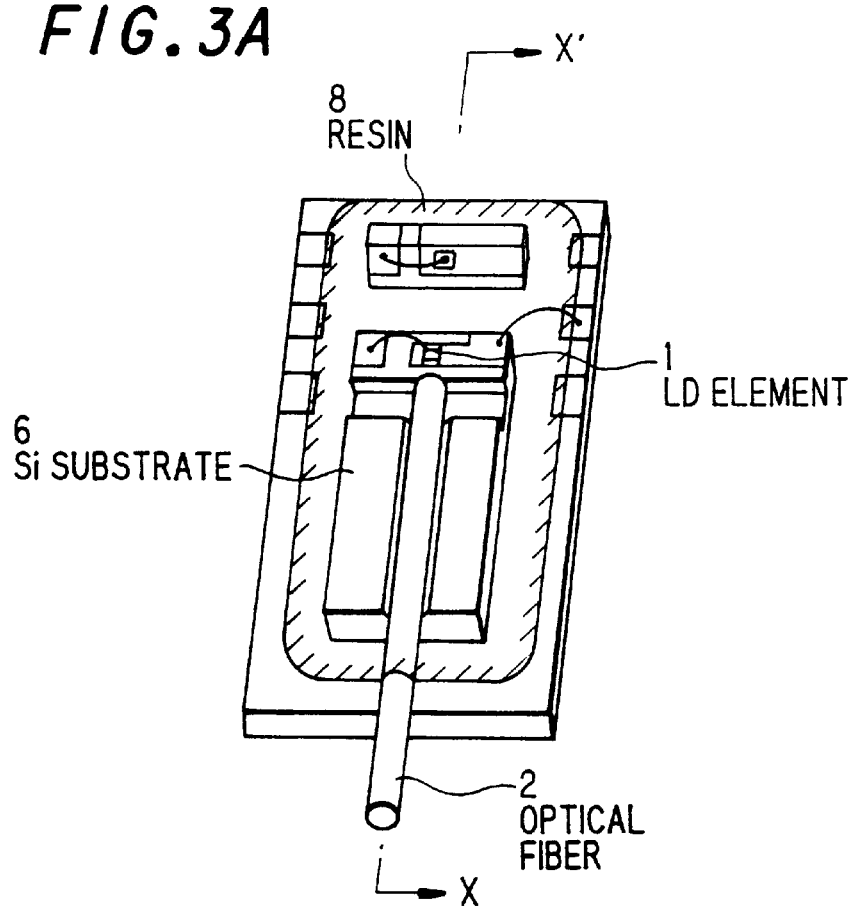
FIG. 3A is a perspective view showing a mounting structure of an optical coupling system in a preferred embodiment according to the invention.

A mounting structure filled with resin in the preferred embodiment according to the invention will be explained in FIGS. 3A and 3B. FIG. 3A is a perspective view showing the mounting structure and FIG. 3B is a partial cross sectional view cut along the line X–X' in FIG. 3A.

Figure 3B:
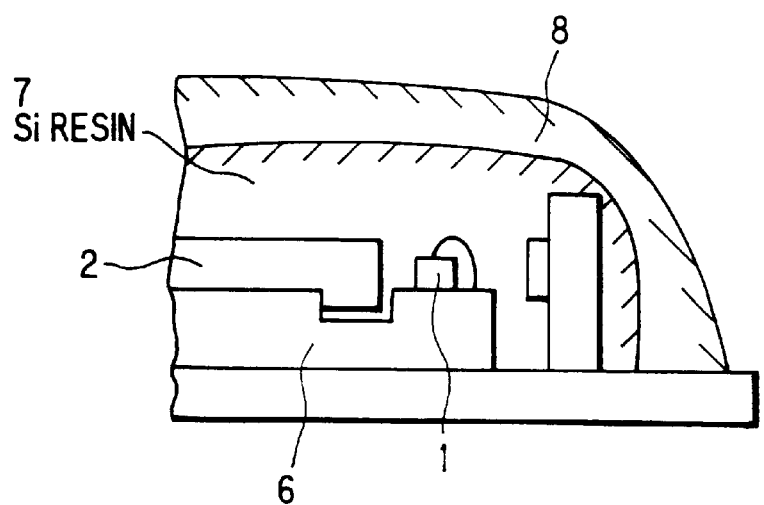
FIG. 3B is a partial cross sectional view cut along the line X–X' in FIG. 3A.

Referring to FIGS. 3A and 3B, the surface of resin 7 with which the optical coupling system is covered is further covered with resin 8 for blocking the permeation of moisture. Thus, it can bring an airtight sealing effect for the optical coupling system. Therefore, a package and a cap used in the conventional airtight sealing are not needed.

Next, the above-mentioned embodiments will be further explained with reference to specific examples thereof. As described above, FIGS. 2A and 2B show the high-efficiency optical coupling system using the gel silicone resin 7. In order to give the optimum coupling when the LD element 1 and the optical fiber 2 are mounted without any regulation, a marker for the mounting of the LD element 1 is formed on the silicone substrate by patterning, and the V-groove 5 for the guiding of the fiber is formed by silicon anisotropic etching.

On the silicone substrate 6, the normal optical fiber 2 or the ball-tipped fiber 10 which has, as shown in FIG. 2B, a hemispherical tip portion formed by etching etc. and the LD element 1 are mounted without any regulation. Then, the clearance between the LD element 1 and the optical fiber 2 or 10 is filled with liquid silicon resin 7.

After filling with silicone resin 7, it is solidified into gel state by ultraviolet radiation or heating to finish the optical coupling system.

In general, when the lens 3 or ball-tipped fiber 10 is used, the tolerance in the optimum coupling of the LD element 1 and optical fiber 2 becomes less than 1 $\mu$m. Namely, the high-precision mounting of both the LD element 1 and optical fiber 2 is required. In case of the optical coupling system where gel silicone resin 7 is used, the refractive index of gel silicon resin 7 lies between that of the air and that of the optical fiber. Therefore, the spot size of beams emitted from the LD element 1 can be enlarged, thereby increasing the coupling tolerance to the optical fiber. Thus, the optical coupling system in this embodiment, which has the simple composition employing resin, can realize the high-efficiency coupling of the LD element and the optical fiber 2 without any regulation.

FIGS. 3A and 3B show an example where gel silicone resin 7 and is moisture-blocking resin a are used for the airtight sealing of the optical system. The coupling of the LD element 1 and the optical fiber 2 is, as described earlier, easily conducted on the silicon substrate 6 without any regulation by using gel silicone resin 7. Then, the surface of gel silicone resin 7 with which the optical coupling system is covered is further covered with resin 8 for blocking the permeation of moisture.

In this embodiment, which employs the structure to be covered with two kinds or resins, the conventional airtight sealing structure needed for optical modules is not necessary.

Figure 5A:
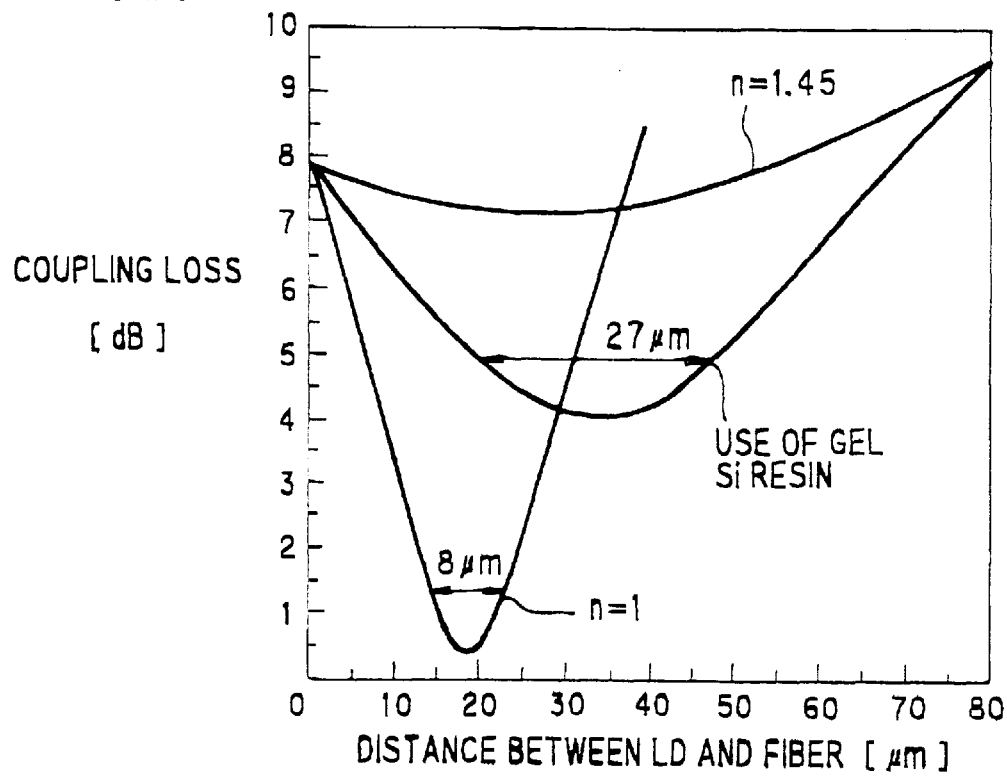
FIG. 5A is a graph showing a relation between the distance ($\mu$m) between a LD element and an optical fiber and the coupling loss (dB)
Figure 5B:
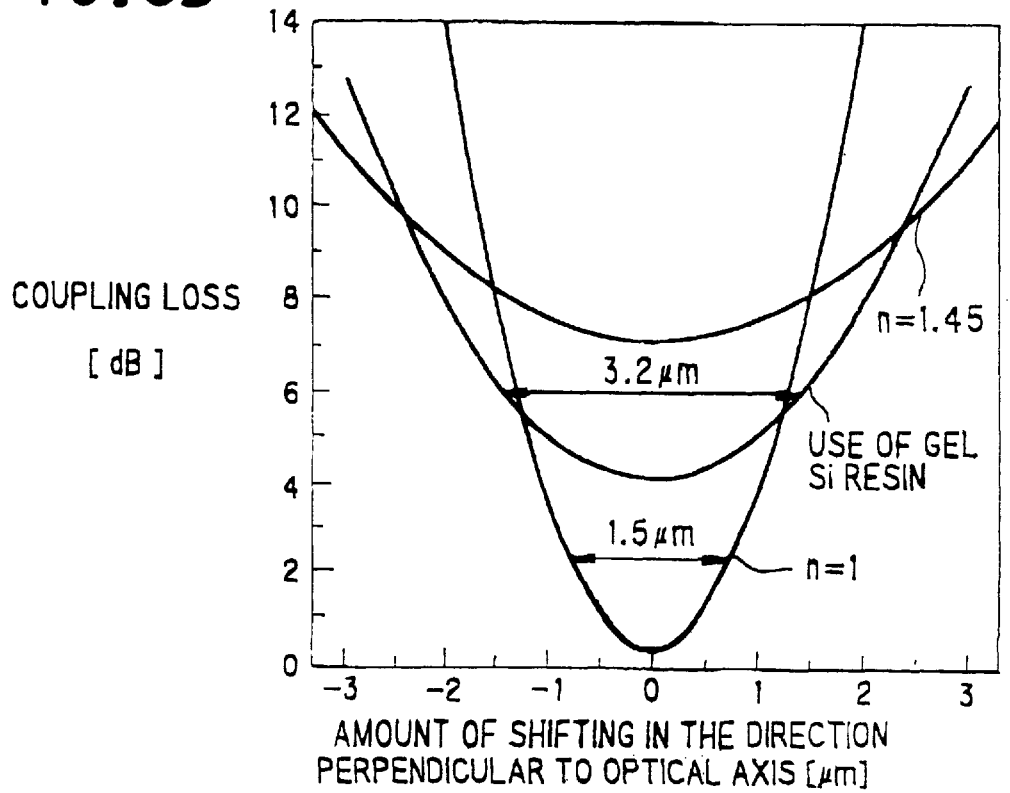
FIG. 5B is a graph showing a relation between the amount of shifting ($\mu$m) in the direction perpendicular to the optical axis and the coupling loss (dB).

By using gel resin with a refractive index higher than that of the air and lower than that of the optical fiber for the coupling system of the LD element and the ball-tipped optical fiber, the coupling tolerance (2 dB down) is relaxed to be greater than 20 $\mu$m in the optical axis direction as shown in FIG. 5A and to be greater than 1.5 $\mu$m in the perpendicular direction of optical axis as shown in FIG. 5B. Therefore, the high-efficiency optical coupling system using the silicone substrate 6 can be realized without any regulation. Meanwhile, FIG. 5A shows a relation between the distance ($\mu$m) between the LD element and optical fiber and the coupling loss (dB), and FIG. 5B shows a relation between the amount of shifting ($\mu$m) in the direction perpendicular to the optical axis and the coupling loss (dB).

In these embodiments, by using gel resin, the filling process into the optical system can be facilitated and the workability can be improved as compared to the filling process of liquid in the conventional optical coupling system. Furthermore, since gel resin has a high elasticity, it can be filled without applying any stress to the optical fiber or IC wiring.

Figure 4A:
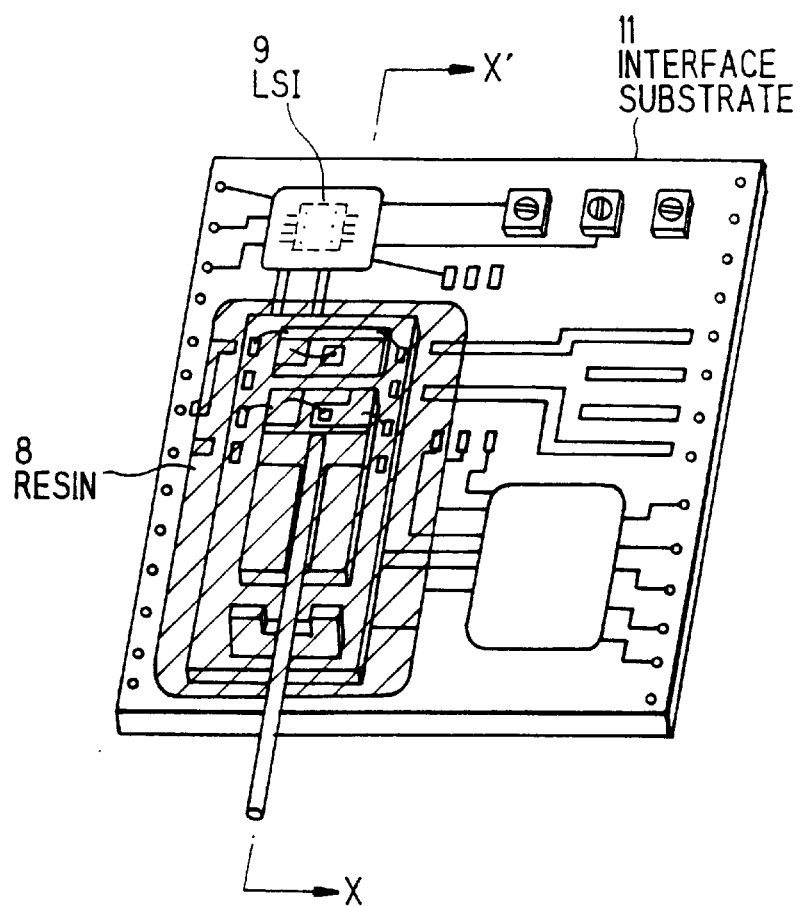
FIG. 4A is a perspective view showing a mounting structure of an optical coupling system in another preferred embodiment according to the invention.
Figure 4B:
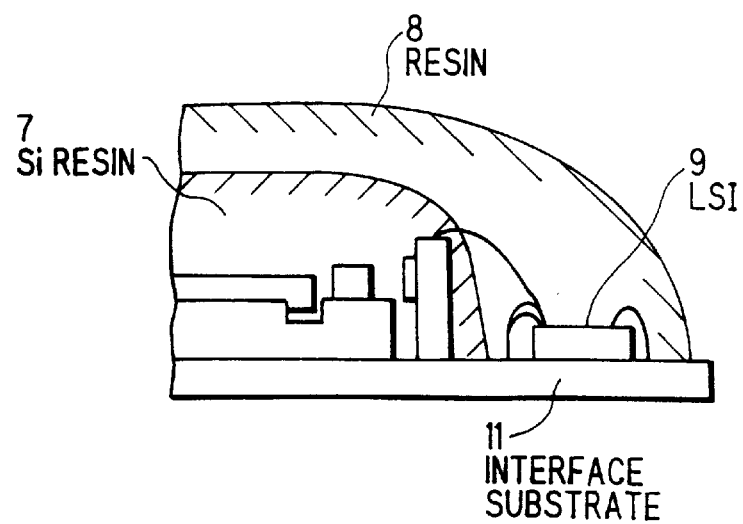
FIG. 4B is a partial cross sectional view cut along the line X–X' in FIG. 4A.

A mounting structure of an optical coupling system with gel resin onto an interface substrate in the preferred embodiment according to the invention will be explained in FIGS. 4A and 4B. FIG. 4A is a perspective view showing the mounting structure and FIG. 4B is a partial cross sectional view cut along the line X–X' in FIG. 4A.

Referring to FIG. 4A, on an interface substrate 11 where LSI 9 for driving the LD element etc. is mounted, the optical coupling system using gel silicone resin 7 as explained in the above embodiments is directly mounted. Then, the optical coupling system and LSI 9 are covered with the moisture-blocking resin 8.

In this embodiment, which employs such a mounting structure, the conventional processes that the optical coupling system is mounted in a package, airtight-sealed and then mounted on the interface substrate 11 are not necessary. Thus, the interface substrate 11 can be easily fabricated.

When conductive resin is used as the moisture-blocking resin 8, the shield effect for LSI 9 can be also obtained thereby.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical coupling system, comprising:

an LD element, and an optical fiber to be optically coupled with said LD element, wherein a region of said optical coupling system between said optical fiber and said LD element is filled with a first optically transparent gel resin with a refractive index higher than that of the air and lower than that of said optical fiber, said first gel resin selected to prevent said first gel resin from flowing out of said space during refractive index alignment, and said optical coupling system is surrounded by said first gel resin and an upper surface of said first gel resin is covered only with a conductive, moisture-blocking resin, said conductive, moisture-blocking resin comprising an uncovered upper surface, wherein said conductive, moisture-blocking resin provides said optical coupling system with moisture sealing and electrical shielding.

2. A mounting structure, comprising an optical coupling system comprising a LD element and an optical fiber to be optically coupled with said LD element, and a substrate including an electric circuit, wherein said optical coupling system is mounted on said substrate, said optical coupling system is filled with optically transparent gel resin with a refractive index higher than that of the air and lower than that of said optical fiber said gel resin selected to prevent said gel resin from flowing out of said space during refractive index alignment, said optical coupling system is surrounded by said gel resin and the surface of said gel resin is covered with a conductive, moisture-blocking resin, and said optical coupling system and a predetermined IC of said electric circuit are covered with said conductive, moisture-blocking resin wherein said conductive, wherein said moisture-blocking resin provides said optical coupling system with moisture sealing and electrical shielding.

3. A mounting structure, comprising:

an optical coupling system comprising a LD element and an optical fiber to be optically coupled with said LD element, and a substrate on which said LD element and said optical fiber are mounted, wherein a space of said optical coupling system intermediate said LD element and said optical fiber is filled with a first resin which is optically transparent and is a non-flowing, solidified gel-state resin so that said first resin independently occupies said space, and the surface of said first resin is covered with a second resin to block moisture, said second resin having an uncovered upper surface, wherein said second resin is a conductive, moisture-blocking resin providing moisture sealing and electrical shielding to an underlying structure.

4. A mounting structure, according to claim 3, wherein:

said substrate is of a silicon substrate and said first resin is of silicone resin.

5. A mounting structure, comprising an optical coupling system comprising a LD element and an optical fiber to be optically coupled with said LD element, a substrate on which said LD element and said optical element fiber are mounted, and an interface substrate which includes an electric circuit for driving and controlling said LD element, said substrate being mounted on said interface substrate, wherein a space intermediate said LD element and said optical fiber of said optical coupling system is filled with a first resin which is optically transparent and is a non-flowing gel resin, and the surface of said first resin and a predetermined electronic part, wiring or integrated circuit on said interface substrate are covered with a conductive second resin to block moisture and provide electrical shielding, said second resin comprising an uncovered upper surface extending upward from a perimeter edge.

6. A mounting structure, according to claim 5, wherein:

said first resin has a refractive index that is higher than that of the air and lower than that of said optical fiber.

7. A mounting structure, according to claim 5, wherein:

said optical fiber is a ball-tipped optical fiber.

* * * * *